Patented Feb. 3, 1948

2,435,404

UNITED STATES PATENT OFFICE 2,435,404

HYDROGENATION OF SULFOLANE ETHERS

Rupert C. Morris and John L. Van Winkle, Berkeley, Calif., assignors to Shell Development Company, San Francisco, Calif., a corporation of Delaware No Drawing. Application November 27, 1943, Serial No. 512,050

5 Claims. (Cl. 260—329)

The present invention relates to the production of saturated cyclic sulfones, i. e. sulfolane compounds, and more particularly pertains to a process whereby sulfolene compounds may be efficiently and economically converted to the corresponding sulfolane compounds.

The term "a sulfolene compound," as employed herein and in the appended claims, defines generically the unsubstituted and substituted unsaturated compounds comprising or containing a sulfolene nucleus, i. e. a five-membered ring of four carbon atoms and a sulfur atom, a single olefinic linkage between any two adjacent carbon atoms of said ring, and two oxygen atoms each of which is directly attached to the sulfur atom thereof. The generic term "a sulfolene compound," therefore, covers the simple unsubstituted sulfolenes, viz. the 3-sulfolene having the general structure

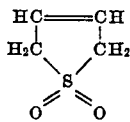

and the 2-sulfolene having the structure

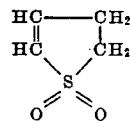

as well as the various substituted derivatives thereof, i. e. sulfolene compounds in which various organic and/or inorganic and particularly hydrocarbon radicals, i. e. alkyl, alkenyl, aryl, aralkyl, alkaryl, alicyclic and/or heterocyclic radicals, are substituted for one or more of the hydrogen atoms of the above unsubstituted sulfolenes.

Similarly, the term "a sulfolane compound" refers to a saturated sulfolene compound. In other words, the sulfolane compound contains or consist of a saturated five-membered ring of four carbon atoms and a sulfur atom, the latter having two oxygen atoms directly attached thereto. The structural formula of the simple unsubstituted sulfolane, therefore, is

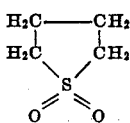

the generic term "a sulfolane" or "a sulfolane compound" covering not only the above compound but also the substituted derivatives thereof, particularly those in which various organic compounds are substituted for one or more of the hydrogen atoms of the above structure.

It has been previously proposed to produce the simple unsubstituted sulfolane, i. e. 2,3,4,5-tetrahydrothiophene-1, 1-dioxide, by subjecting 3-sulfolene (also known as 2,5-dihydrothiophene-1, 1-dioxide) to the action of hydrogen in the presence of a base metal hydrogenation catalyst. Because of certain inherent defects, this process of producing the sulfolane is of very limited utility. For instance, 3-sulfolene is quite unstable and decomposes rapidly into butadiene and sulfur dioxide at temperatures in the neighborhood of 120° C. to 125° C. On the other hand, the catalytic hydrogenation reaction is of a highly exothermic character. Therefore, when 3-sulfolene is to be hydrogenated in the presence of a metal hydrogenation catalyst and according to the known process, it is necessary to control the reaction temperature very carefully to prevent any excessive rise thereof into or close to the region in which the aforesaid decomposition occurs. This requires complicated and costly means for cooling of the reactor, and/or a relatively slow introduction of hydrogen into the 3-sulfolene, thereby lowering the yield of the desired hydrogenated product per unit of time. Additionally, it was found that the catalyst employed for the hydrogenation of 3-sulfolene and, in fact, of other sulfolene compounds, and particularly those containing an unsaturated linkage in the 3-position in the nucleus, is de-activated in a relatively short period of time even if the hydrogenation reaction is effected at a temperature which is below the decomposition temperature of the sulfolene compound treated.

It is an object of the present invention to avoid the above and other defects and to provide an economical process for the production of sulfolane compounds. It is another object of the invention to provide a process whereby sulfolene compounds, irrespective of whether they contain an unsaturated or olefinic linkage in the 2-, 3- or 4-position, may be readily, economically and substantially quantitatively converted to the corresponding sulfolane compounds. A further object is to provide a process in which the catalyst employed in one of the steps of said conversion of sulfolene compounds to the corresponding sulfolane compounds will be active for a relatively long period of time, thereby avoiding the necessity of frequent interruption of said conversion process for the purpose of reactivating and/or replacing said catalyst. Still other objects will be apparent from the following description of the invention.

It has now been discovered that the above and other objects may be attained by first reacting the sulfolene compound with an alcohol to produce the corresponding sulfolanyl ether and then subjecting the latter to the action of hydrogen in the presence of a metal hydrogenation catalyst and under temperature and pressure conditions which will cause hydrogenolysis, thereby producing the sulfolane compound corresponding to the starting sulfolene compound and liberating the alcohol, which latter may be repeatedly used for the production of additional amounts of sulfolanyl ethers which, in turn, may be subjected to said hydrogenolysis.

The term "sulfolanyl ether" as employed herein and in the appended claims denotes a sulfolane compound in which a hydrocarbon radical which may be alkyl, alkenyl, aryl, aralkyl, alkaryl, alicyclic or heterocyclic is attached to one of the nuclear carbon atoms of the sulfolane compound via an ethereal oxygen atom. An illustrative example of a sulfolanyl ether compound is a compound having the following general structure

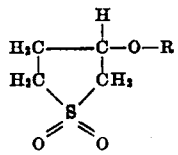

wherein R represents an organic substituent and preferably a hydrocarbon radical. The —OR radical may be attached to any other of the above nuclear carbon atoms of the sulfolane nucleus. Also, the sulfolanyl ethers may contain other substituents, particularly hydrocarbon radicals, substituted for one or more of the hydrogen atoms on said nuclear carbon atoms. It has been previously proposed to produce sulfolanyl ethers having the above general formula in which the radical R stands for a saturated alkyl radical having up to 9 carbon atoms by reacting 3-sulfolene with a saturated aliphatic alcohol containing up to 9 carbon atoms, this reaction being preferably effected at ordinary temperatures and pressures and in an alkaline medium.

It has now been discovered that unsubstituted and substituted sulfolanyl ethers may be readily converted to the corresponding sulfolane compound by subjecting said sulfolanyl ethers to the action of hydrogen in the presence of a metal hydrogenation catalyst and under pressure and temperature conditions which will favor the rupture of the bond between the nuclear carbon atom and the ethereal oxygen atom, thereby forming two radicals both of which are simultaneously or substantially simultaneously hydrogenated to produce the desired sulfolane compound and the alcohol. One of the advantages of this process resides in the fact that this hydrogenolysis may be realized at temperatures considerably higher than those permissible for the hydrogenation of the corresponding sulfolene compound. Also, the rate of reaction is considerably higher. Additionally, the catalyst life is materially prolonged as compared to the life of the same catalyst when it is employed as the hydrogenating catalyst for the hydrogenation of the corresponding sulfolene compound.

As stated, one of the methods of producing the sulfolanyl ethers (which may then be subjected to the aforesaid hydrogenolysis) comprises reacting a sulfolane compound with an alcohol, preferably in the presence of a catalyst, e. g. a strong base of the type of sodium hydroxide. The alcohol which may thus be reacted with the sulfolene compound may be a primary, secondary or tertiary alcohol, and may be a saturated or unsaturated aliphatic, alicyclic or aromatic alcohol. The following is an exemplary list of such alcohols which may be reacted via addition with a sulfolene compound to form the corresponding sulfolanyl ether compound: saturated aliphatic alcohols, such as methyl alcohol, ethyl alcohol, n-propyl alcohol, isopropyl alcohol, n-butyl alcohol, isobutyl alcohol, secondary butyl alcohol, tertiary butyl alcohol, n-amyl alcohol, secondary butyl carbinol, iso-amyl alcohol, neopentyl alcohol, tertiary amyl alcohol, hexyl alcohols, heptyl alcohols, octyl alcohols, lauryl alcohol, and the like and their homologues; unsaturated aliphatic alcohols, e. g. allyl alcohol, crotyl alcohol, methyl vinyl carbinol, butenyl alcohols, pentenyl alcohols, methallyl alcohol, oleyl alcohol, and the like; alicyclic alcohol, such as cyclopentanol and cyclohexanol; aromatic alcohols, e. g. benzyl, phenyl methyl, phenyl ethyl, phenyl vinyl alcohols, and the like, as well as substituted derivatives, e. g. those in which a halogen atom is substituted for a hydrogen atom of the alcohol. In this connection it must be noted that the sulfolanyl ether compounds produced by the addition of the above alcohols to the sulfolene compounds are subjected to catalytic hydrogenolysis under relatively severe conditions which, at least in most cases, will saturate any unsaturated linkages which may be present in the sulfolanyl ether compound.

Since one of the advantageous features of the present invention resides in the fact that the hydrogenolysis step liberates the alcohol which may then be re-used, it is preferable to employ originally saturated aliphatic and alicyclic alcohols as well as aromatic alcohols which will produce sulfolanyl ether compounds which, during the subsequent hydrogenolysis step, will release the same alcohol as originally employed, particularly in view of the fact that the use of such alcohols does not unnecessarily use up any of the hydrogen. However, in some cases it may be desirable and even advantageous to subject to the hydrogenolysis step sulfolanyl ethers in which the side chain attached to the ethereal oxygen atom contains one or more unsaturated linkages.

Any sulfolene compound may be employed as the starting material to produce the corresponding sulfolane compound. These sulfolene compounds may contain an olefinic or double bond in the 2-, 3- or 4-position in the ring, the various unsatisfied bonds of the nuclear carbon atoms of the sulfolene ring being taken up by hydrogen atoms and/or hydrocarbon radicals, particularly saturated aliphatic radicals. As examples of these sulfolene compounds which may be reacted with the alcohols to produce the sulfolanyl ethers, the latter being then subjected to hydrogenolysis to produce a sulfolane compound corresponding to the starting sulfolene compound employed, reference is made to the following: 3-sulfolene, 2-sulfolene, 2-methyl-3-sulfolene, 3-methyl-3-sulfolene, 3-methyl-2-sulfolene, 3-ethyl-3-sulfolene, 3 - ethyl - 2 - sulfolene, 2,4-dimethyl-3-sulfolene, 2,4 - dimethyl-2-sulfolene, 2,4-dimethyl-4-sulfolene, and the like, and their homologues, as well as similar sulfolene compounds wherein other hydrocarbon radicals, as well as substituted hydrocarbon radicals which may be aliphatic, alicyclic, aromatic and/or heterocyclic, are directly attached to the various nuclear carbon atoms.

The hydrogenolysis of the sulfolanyl ethers produced by the interaction of the above mentioned and similar sulfolene compounds with the stated alcohols is effected in accordance with the process of the present invention in the liquid state and in the presence or absence of a solvent for said sulfolanyl ether. Although solvents of the type of benzene, dioxane and even the sulfolane compounds themselves may be employed as the solvent or solvents for the sulfolanyl ether compounds, a preferred class of solvents comprises the alcohols and particularly the alcohol which has been employed in the production of the specific sulfolanyl ether compound. For instance, if the sulfolanyl ether compound was formed by the interaction of a sulfolene compound, e. g. 3-sulfolene, with isopropyl alcohol, thereby producing isopropyl sulfolanyl ether, the solvent should preferably be isopropyl alcohol because this avoids the subsequent separation of different alcohols from the reaction products formed during the hydrogenolysis step. However, this merely involves a question of economics, and other alcohols such as ethyl alcohol, tertiary butyl alcohol, and the like, may be employed as the solvent or diluent.

The hydrogenolysis of the sulfolanyl ether compounds is effected by subjecting these compounds to the action of hydrogen in the presence of a hydrogenation catalyst, a preferred class comprising metal hydrogenation catalysts. Although active nickel is a highly desirable hydrogenation catalyst to be used in the hydrogenolysis step, it has been found that for the purpose of the present invention suitable metal hydrogenation catalysts may contain or consist of other metals, such as cobalt, copper, platinum, palladium or mixtures of these metals with themselves or with other metals such as iron, zinc, chromium, cadmium. etc. These catalysts may be prepared in any suitable manner. For instance, an active nickel catalyst may be prepared by gradually heating purified nickel nitrate to about 350° C. to 400° C., followed by a reduction of the nickel oxide thus formed in a stream of hydrogen at temperatures in the neighborhood of from 300° C. to 350° C. A particularly suitable active nickel catalyst material is a finely divided active nickel which may be used in suspension in the liquid solution comprising or containing the sulfolanyl ether compound to be subjected to hydrogenolysis. Such active nickel may be produced by known methods, e. g. by the decomposition of nickelous formate at about 250° C., or by a treatment of an alloy of nickel and aluminum with caustic solutions. The optimum amount of the hydrogenation catalyst to be employed will depend on a number of variables, such as the specific sulfolanyl ether compound treated and the particular hydrogenation catalyst employed, as well as the hydrogen pressure and temperature used.

The temperatures and hydrogen pressures to be used during the hydrogenolysis of the sulfolanyl ether compounds must be sufficient to effect the rupture of the bond between the nuclear carbon atom and the ethereal oxygen atom. The optimum temperature and hydrogen pressure to be employed will vary depending on the specific sulfolanyl ether treated, the metal hydrogenation catalyst employed, the amount thereof, and on the presence or absence of a solvent. An increase in temperature and/or pressure will usually increase the rate of reaction. However, the maximum temperature should be preferably below that at which the decomposition of the nucleus will occur. Generally, the hydrogenolysis reaction temperature will vary between about 100° C., or even lower, and the temperature at which nuclear decomposition occurs. In the case of the hydrogenolysis of isopropyl sulfolanyl ether, this reaction was found to start at about 135° C. and to proceed at an economical rate at about 175° C. With some sulfolanyl ether compounds, e. g. benzyl sulfolanyl ethers, somewhat lower temperatures, e. g. of the order of about 100° C. or even lower, may be used, while other ether compounds will require temperatures in the neighborhood of about 200° C. or even higher. As to the reaction pressure, any positive hydrogen pressure may be employed. Although the hydrogenolysis may be realized at atmospheric pressure, the reaction is usually too slow at such a pressure. Therefore, the use of superatmospheric pressures, e. g. about 300 lbs. per sq. in. to 1000 lbs. per sq. in. or even higher, is preferred because such higher pressures increase the rate of reaction.

The following is an illustrative example of a preferred embodiment of this invention.

*Example*

Isopropyl 3-sulfolanyl ether was prepared by reacting 3-sulfolene with isopropyl alcohol in the presence of a strong base, e. g. sodium hydroxide. About 53 parts by weight of the isopropyl 3-sulfolanyl ether were mixed with about 81 parts by weight of isopropyl alcohol (employed as a diluent or solvent) and with approximately 30 parts by weight of an active nickel catalyst. This solution was then introduced into a hydrogenation reactor in which the solution was maintained under a hydrogen pressure of about 1000 lbs. per sq. in., and at a temperature of about 175° C. The reaction appeared to set in at about 130° C. to 135° C., and was quite rapid at 175° C. On completion of the reaction, the isopropyl alcohol was flashed off. The sulfolane was then distilled. The material boiled at 118 C. at 5 mm. of mercury pressure, and had a melting point of 25° C. Further analysis showed that it was sulfolane (2,3,4,5-tetrahydrothiophene-1,1-dioxide). The yield was substantially quantitative, one mol of the isopropyl 3-sulfolanyl ether yielding approximately a mol of the sulfolane and an equimolal amount of isopropyl alcohol. The latter may then be re-used, thus permitting the continuous conversion of the sulfolene compound to produce the corresponding sulfolane compound.

We claim as our invention:

1. A process for the production of sulfolane which comprises subjecting isopropyl 3-sulfolanyl ether, in the presence of an active nickel hydrogenation catalyst, to the action of hydrogen, at a temperature of between about 135° C. and about 200° C., and under a superatmospheric pressure, thereby converting the isopropyl 3-sulfolanyl ether into sulfolane and isopropyl alcohol, and separating the sulfolane from the reaction mixture.

2. A process for the production of a sulfolane compound which comprises subjecting a sulfolanyl ether compound in which an alkoxy radical is attached to the carbon atom in the 3-position in the sulfolane ring, in the presence of an active nickel hydrogenation catalyst, to the action of hydrogen at a temperature of between about 135° C. and about 200° C. under a superatmospheric pressure at which ether splitting takes place, and separating the sulfolane compound thus formed from the reaction mixture.

3. A process for the production of a sulfolane compound which comprises subjecting a sulfolanyl ether compound, in the presence of a metal hydrogenation catalyst, to the action of hydrogen at a temperature of between about 135° C. and about 200° C., and under a superatmospheric pressure at which ether splitting takes place, and recovering the sulfolane compound and alcohol thus formed from the reaction mixture.

4. In a process for the production of sulfolane compounds, the steps of subjecting a sulfolanyl ether compound containing a saturated aliphatic radical directly attached to the ethereal oxygen atom of the sulfolanyl ether compound to the action of hydrogen in the presence of a metal hydrogenation catalyst and at a temperature above 100° C. but below that at which substantial splitting of carbon-to-carbon bonds occurs, and separating the sulfolane compound thus formed from the reaction mixture.

5. In a process for the production of sulfolane compounds, the steps of subjecting a sulfolanyl ether compound containing an aliphatic radical directly attached to the ethereal oxygen atom of the sulfolanyl ether compound to the action of hydrogen in the presence of a hydrogenation catalyst and at a temperature above 100° C. at which ether splitting takes place but below that at which substantial splitting of carbon-to-carbon bonds occurs, and separating the sulfolane compound thus formed from the reaction mixture.

RUPERT C. MORRIS.
JOHN L. VAN WINKLE.

REFERENCES CITED

The following references are of record in the file of this patent:

UNITED STATES PATENTS

| Number | Name | Date |
|---|---|---|
| 2,219,006 | Delfs | Oct. 22, 1940 |
| 2,233,999 | Farlow | Mar. 4, 1941 |
| 2,291,798 | Delfs | Aug. 4, 1942 |

FOREIGN PATENTS

| Number | Country | Date |
|---|---|---|
| 489,974 | Great Britain | Aug. 8, 1938 |
| 682,079 | Germany | Oct. 7, 1939 |
| 847,254 | France | June 26, 1939 |